United States Patent
Hildebrand et al.

(10) Patent No.: US 6,873,860 B2
(45) Date of Patent: Mar. 29, 2005

(54) BASE TRANSCEIVER STATION WITH DISTORTION COMPENSATION

(75) Inventors: Uwe Hildebrand, Erlangen (DE); Michael Jeck, Nürnberg (DE); Thomas Unshelm, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 09/988,490

(22) Filed: Nov. 20, 2001

(65) Prior Publication Data

US 2002/0098871 A1 Jul. 25, 2002

(30) Foreign Application Priority Data

Nov. 24, 2000 (EP) .................................. 00125718

(51) Int. Cl.$^7$ ................................................. H04B 1/38
(52) U.S. Cl. .................... 455/561; 455/501; 455/114.3; 455/115.1; 455/126; 375/296; 375/297; 330/149; 330/151
(58) Field of Search .............................. 455/127.1, 561, 455/114.3, 115.1, 126; 375/296, 297; 330/149, 151

(56) References Cited

U.S. PATENT DOCUMENTS

| | | | |
|---|---|---|---|
| 5,404,378 A | 4/1995 | Kimura | 375/296 |
| 5,740,520 A | 4/1998 | Cyze et al. | 455/69 |
| 6,304,747 B1 * | 10/2001 | Loostrom et al. | 455/67.14 |
| 6,449,466 B1 * | 9/2002 | Jin et al. | 455/127.2 |
| 6,636,555 B1 * | 10/2003 | Frank et al. | 375/146 |
| 6,693,974 B2 * | 2/2004 | Jin et al. | 375/297 |

FOREIGN PATENT DOCUMENTS

| | | |
|---|---|---|
| EP | 0928072 A2 | 7/1999 |
| EP | 0948227 A1 | 10/1999 |
| EP | 0957587 A2 | 11/1999 |

OTHER PUBLICATIONS

European Search Report, Application No. EP 00125718, Jul. 23, 2001, pp. 1–3.
"Digital cellular telecommunications system (Phase2+); Radio transmission and reception (GSM 05.05 version 8.3.0 Release 1999)," Draft GSM 05.05 v8.3.0 (Dec. 1999), pp. 24–25, 82, 88.

* cited by examiner

*Primary Examiner*—William Trost
*Assistant Examiner*—Danh Le

(57) ABSTRACT

A base transceiver station for a radio communication system comprises a transmitter unit (TU), a receiver unit (RU) and a transmit path between the transmitter unit (TU) and an antenna. The receiver unit (RU) determines output data from received signals and the transmitter unit (TU) converts input data into transmitted signals and pre-distorts the transmitted signals using at least one compensation value. The base transceiver station comprises also a branching unit for transferring at least a portion of a transmitted signal from the transmit path to the receiver unit (RU) and a processing unit (PU) which is adapted to receive a representation of the input data and the output data. The processing unit (PU) compares the input data to the output data, determines a first compensation value for the pre-distortion according to the comparison and updates the compensation value of the transmitter unit (TU) with the first compensation value. Methods and computer programs embodying the invention are also described.

26 Claims, 3 Drawing Sheets

BASE TRANSCEIVER STATION WITH DISTORTION COMPENSATION

BACKGROUND OF THE INVENTION

The present invention relates to a base transceiver station provided with a transmitter unit, a receiver unit and a transmit path between the transmitter unit and an antenna, wherein the receiver unit determines output data from received signals and the transmitter unit converts input data into transmitted signals and pre-distorts the transmitted signals using at least one compensation value. Methods and software programs embodying the invention are also described.

Base transceiver stations for radio communication systems provide wireless connections, e.g. to user equipment. A radio communication system can be for example a mobile communication system, a satellite communication system or a radio system for point to point transmissions. The base stations comprise at least one transmitter unit which is connected over a transmit path to an antenna or to an antenna system with several antennas. The transmitter unit converts input data, i.e. information bits, into radio signals for transmission on a wireless link. The transmit path comprises generally at least one radio frequency filter and can include further components, e.g. an amplifier such as a tower mounted amplifier. A base transceiver station also comprises one or more receiver units and corresponding receive paths between an antenna or antenna system and the respective receiver unit. The receiver unit determines output data from received radio signals. In most cases, a receiver unit and a transmitter unit are combined in a transceiver.

The filters are often a part of a combining and distribution unit for the connection of one or more transmitter units or receiver units to one or more antennas. Parts of the receive and the transmit paths can be embodied by shared components, e.g. if the same antenna is used for transmitting and receiving signals or if a combining and distribution unit combines signals from different transmitters to an antenna and distributes received signals from an antenna to different receivers. Alternatively, the receive and the transmit paths can be separate if different antennas are used for transmission and reception.

For several modulation schemes, e.g. 8-PSK (phase shift keying) as used in EDGE (Enhanced Data rates for GSM Evolution) or quadrature amplitude modulation (QAM), a transmitted signal, also denoted as a symbol, comprises more than one information bit each. This can be achieved by mapping the symbols on a so-called I-Q plane, the points in the plane representing different phase shifts and amplitudes of transmitted signals. In these cases, the input data can be separated in the transmitter unit into an I-(inphase) and a Q-(quadrature phase) component. The components are again combined in the transmitter unit forming complex signals representing the information on the wireless connection.

The components in the transmit path distort the transmitted signals. Distortions which are acceptably small for a first transmission scheme, e.g. Gaussian minimum shift keying (GMSK) as used in GSM (Global System for Mobile Communication), may be too large for other modulation schemes. The distortions in the transmit path of a base transceiver station can therefore become a problem if the transmitter of the base transceiver station is updated for another transmission scheme, e.g. to allow an increased data rate.

A measure of the distortions is the error vector magnitude for which measurement procedures are defined for example in the specification Draft GSM 05.05, V8.3.0, European Telecommunications Standards Institute, 1999. Maximum values for the root mean square, the peak value and the $95^{th}$ percentile of the error vector magnitude have to be observed by a base transceiver station according to this specification. For example, the maximum allowed root mean square error vector magnitude is 8% while the allowed peak error vector magnitude is 22%, both measured at the antenna reference point, i.e. the output of the transmit path to which the antenna is connected. In order to achieve high data rates, e.g. for EDGE, distortions should be as low as possible.

The distortion of transmitted signals can be reduced by a pre-distortion which takes components in the transmit path into account. For the correction of error vectors, a compensation value is used to calculate offsets for the transmitted signals. A compensation value can be determined for every type of component in a transmit path, for example for a combining and distribution unit which can be installed in a base transceiver station. When a component of said type is installed in the base transceiver station, the corresponding compensation value is entered into the transmitter for the pre-distortion of the signals transmitted.

Every individual of a given component distorts signals in a slightly different way and the distortion will especially vary for different revision states of the component. When a transmitter is upgraded and the base transceiver station has to observe stricter error vector requirements, correction values for already installed components may not be available while typical values for the respective type of component are not sufficiently exact. Furthermore, the performance of components can vary in time, e.g. due to aging or if tunable filters are used. These variations are not corrected by fixed compensation values. If more than one component is part of the transmit path, e.g. a combining and distribution unit with filters and a tower mounted amplifier, it is difficult to obtain a compensation value which considers the influence of all components.

Finally, distortions depend on the frequency of the transmitted signals. If a common compensation value is used for all frequencies of a transceiver, the correction can be insufficient for all or some of the frequencies. If, however, compensation parameters for all possible frequencies are stored, this requires a large memory which has to be updated if additional frequency bands are added.

SUMMARY OF THE INVENTION

It is an object of the present invention to obviate the above disadvantages and provide a base transceiver station with a low distortion of transmitted signals and a method for obtaining low distortions. It is a further object, to provide a base transceiver station and a method which allow a simple adaptation to changes in the transmit path.

The above objects are achieved by a base transceiver station for a radio communication system. The base transceiver station is provided with a transmitter unit, a receiver unit and a transmit path between the transmitter unit and an antenna, wherein the receiver unit (RU) determines output data from received signals and the transmitter unit converts input data into transmitted signals and pre-distorts the transmitted signals using at least one compensation value. The base transceiver station further comprises a branching unit and a processing unit as described hereinafter in further detail. Furthermore, the invention is embodied in a method and a program unit as described hereinafter. Advantageous embodiments are hereinafter described and claimed.

In the base transceiver station according to the invention, a branching unit transfers all or a portion of a transmitted signal from at least one transmit path between a transmitter unit and an antenna to a receiver unit. A corresponding branching unit can be provided for every transmit path in the base transceiver station or for every transmit path used for specified transmission schemes.

The processing unit is adapted to receive data from the transmitter unit and the receiver unit. The processing unit can be a separate unit or be part of the transmitter unit or the receiver unit. The transmitter unit, the receiver unit and the processing unit can all be part of one transceiver. The processing unit can be embodied as hardware device or as software executed in a processing system of the base transceiver station or a transceiver.

A representation of the input data for the transmitted signals, for example a vector with the I and Q values determined in the transmitter unit, are forwarded from the transmitter unit to the processing unit. The receiver unit determines output data from received signals and forwards a representation of the output data to the processing unit, preferably the I and Q values determined from the received signals. The processing unit then compares the input data to the output data, i.e. the representations. From the comparison, the processing unit determines a compensation value for a pre-distortion. The determined compensation value is transmitted to the transmitter unit for an update of the present compensation value. The adaptation of the compensation value can be repeatedly performed until a required threshold for the maximum distortion is attained. If the components inducing the major distortions in the transmit path are shared by several transmitters, e.g. a common combining and distribution unit and a tower mounted amplifier, it is possible to determine common compensation values.

The proposed base transceiver station is capable of adaptively minimizing signal distortions, especially the error vector magnitude, without a priori information of the components in the transmit path. Therefore, it is especially suitable for already installed components about which no or limited information is available, e.g. if an installed base transceiver station is updated, and for components inducing varying distortions like tunable filters. In contrast to the consideration of individual components within the base transceiver station, the distortion of the complete transmit path can be considered. Variations of distortions, e.g. due to aging or exchange of components during future updates are taken into account. Low error vector magnitudes can be attained which allow high transmission rates. Because the base transceiver station measures only used frequency channels, the number of measurements and the memory required to store compensation values is small even if different compensation values depending on the transmission frequency are used. An especial advantage of the proposed radio base station is its ability to use a comparatively simple processing unit while an existing receiver unit is used for the determination of the output data from the transferred signals.

To reduce the interference between sent and received signals, the frequency ranges for transmission and reception of a base transceiver station are generally different with filters in the receive path blocking transmission bands and filters in the transmit path blocking reception bands. In a preferred embodiment, the branching unit comprises a converter for converting the frequency of the transferred signal to the input range of the receiver. If other methods are used to reduce interference between sent and received signals, e.g. a shift between transmission and reception in the time domain, the converter preferably performs a corresponding conversion, e.g. a signal delay with a delay element.

It is proposed that the converter comprises a mixer and an oscillator for a simple conversion of the signal frequency. The frequency of the oscillator is preferably half the difference in frequency between the transmission band and the reception band. The mixer mixes the signal generated by the oscillator and the signals transferred from the transmit path.

The distortion of signals is significantly higher in the transmit path than in the receive path, e.g. due to narrower filters and active components like amplifiers. Therefore, a receive path connecting an antenna and the receiver unit can be used to transfer the output of the branching unit to the receiver unit instead of a separate connection. Correspondingly, the branching unit can comprise a connection between the transmit path and the receive path. This embodiment is advantageous if the paths are separate without a common section, i.e. if the base transceiver station has different antennas for reception and transmission of radio signals.

Often, the transmit path and the receive path have a common section. An advantageous branching unit branches the transmitted signal off from the common section and feeds the transferred signal back into the common section. This allows reduction of the length of connections required for the branching unit.

Preferably, the branching unit is connected to the transmit path at or near the antenna reference point, i.e. after all components which are part of the transmit path. In this way, the total contribution of all components to the signal distortion at the antenna input is considered.

An advantageous branching unit is joined to the transmit path, the receive path or both with a coupler. The base transceiver station can in this way transmit during the measurements and the signal level can be adapted by the couplers to the value required at the receiver input. A switch and a corresponding control unit can be avoided for branching off the signals. Couplers can also be replaced by radio frequency switches. Especially for the connection of the branching unit to the receive path, a switch is often advantageous because disconnecting the antenna from the receiver avoids interference of the transferred signals and outside signals received over the antenna. A damping device in the branching unit can be used for adaptation of the signal level, especially if switches are used.

The foregoing and other objects, features and advantages of the present invention will become more apparent in the following detailed description of preferred embodiments as illustrated in the accompanying drawings.

DETAILED DESCRIPTION OF PREFERRED EMBODIMENTS OF THE INVENTION

Figure 1:
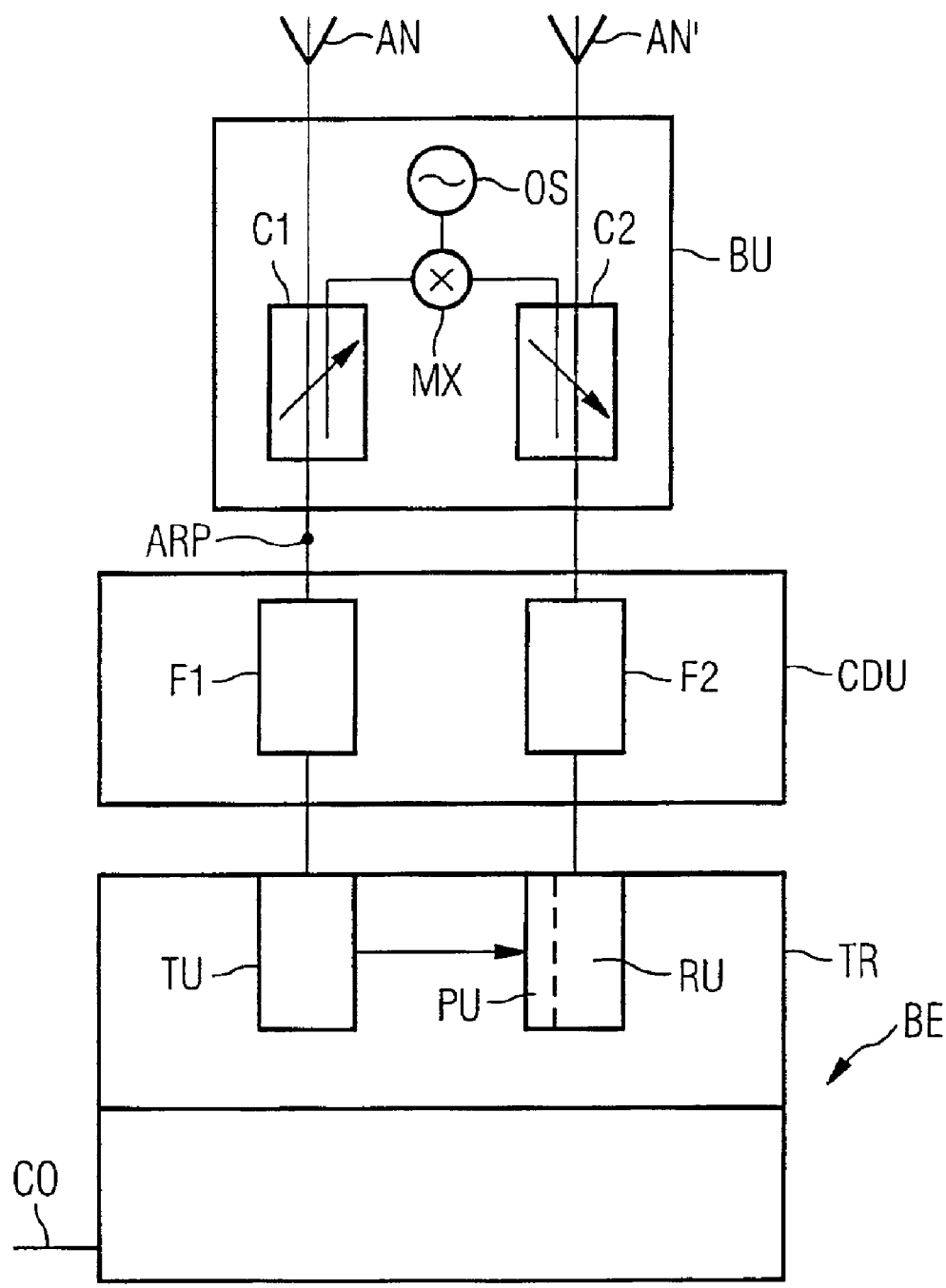
FIG. 1 shows a first base transceiver station according to the invention

In FIG. 1, a base transceiver station according to the invention is depicted. The base transceiver station comprises a base station equipment BE with one or several transceivers TR. The base station equipment BE receives user data and control information from a further node in a communication system via a connection CO, e.g. from a base station controller (BSC) or a radio network controller (RNC) which connect the base transceiver station to a core network. The control information can for example comprise commands to change parameters used for radio signals like the frequency channels for transmission or reception of radio signals. The base station equipment BE controls the other components in the base transceiver station, especially the transceivers TR and a combining and distribution unit CDU. The combining and distribution unit CDU connects the transceivers TR to one or several antennas AN, AN' for the emission and reception of radio signals.

Every transceiver TR comprises a transmitter unit TU which converts input data, for example user data and control signals, into radio signals for transmission over antenna AN. A receiver unit RU converts signals received over antenna AN' to output data. If the modulation scheme for radio transmission uses signals with different complex signal vectors for transmitted signals, the information bits of the input data are separated in the transmitter unit TU into an I-(inphase) and a Q-(quadrature phase) component. The signals of the I- and Q-component are then combined in the transmitted signals with a phase shift of 90° relative to each other. Correspondingly, a transmitted signal can be represented by a vector SV in the I/Q plane as depicted for example in FIG. 3. In the receiver unit RU, received signals are separated into an I- and a Q-component for transformation to output data.

The connection of a transmitter unit TU to an antenna AN is denoted as transmit path while the connection of an antenna AN' to a receiver unit RU is denoted as receive path. Depending on the type of combining and distribution unit CDU, transmit and receive paths can share sections if the combining and distribution unit CDU combines the signals from several transmitter units TU to one antenna AN or distributes the signals received by one antenna AN' to several receiver units RU. The output port of the base transceiver station to the antenna AN, i.e. the end of the transmit path, is denoted as antenna reference point ARP. Components in the transmit and receive paths, e.g. band pass filters F1, F2, distort the signals. Generally, the distortion by components in the transmit path is considerably higher because filters F1 with a narrower pass band are used than in the receive path.

The number of information bits per radio signal is a function of the number of defined states for transmitted signals. Each defined state corresponds to a specific combination of information bits. Conversely, the number of erroneously determined information bits at a receiver depends on the distance of defined states from each other in the I/Q plane because the radio signals are modified by distortions in the transmit path and disturbances on the air interface. Therefore, the error vectors caused by the transmit path should be as low as possible to avoid erroneously determined information bits. This is especially a problem if a high data rate is achieved by a close spacing of defined states in the I/Q plane as for example in 8-PSK modulation.

To compensate distortions in the transmit path, the transmitter unit TU performs a pre-distortion of the transmitted signals. For the pre-distortion, at least one compensation value can be stored in a memory of the transmitter unit. It is possible that several compensation values are stored corresponding to different transmission frequencies. The compensation values are determined as explained below. In case of compensation values corresponding to different frequencies, the determination of a compensation value is preferably repeated for every frequency channel used by the transmitter.

When the determination of a compensation value is initiated, information for performing the determination is selected. The information can either consist of traffic determined for users or special measurement data. The transmitter unit TU forwards a representation of the input data for a selected signal or group of signals to a processing unit PU in the receiver unit RU, for example over a bus system of the transceiver TR or a shared memory. Furthermore, the transmitter unit sends the radio signals corresponding to the selected information into the transmit path.

At the antenna reference point ARP, a branching unit BU is connected to the transmit path. The branching unit BU comprises a first coupler C1. The coupler C1 transfers a portion of the signals to a mixer MX. The mixer MX is connected to an oscillator OS and mixes the oscillator signal and the transferred signal to shift the frequency to the reception range of the receiver unit RU. The shifted signal is then fed by a second coupler C2 into the receive path of receiver unit RU. The couplers C1, C2 have preferably a high directivity, i.e. only a small portion of the coupled signal is transferred from the first input to the second input of the coupler. This is especially important for the second coupler C2 to avoid an emission of the signals over the antenna. One or both couplers C1, C2 could be replaced by radio frequency switches.

The received signals are then processed by the receiver unit RU and a representation of the output data is in this way available at the processing unit PU. The processing unit PU compares the representations of the input data and the output data and determines a compensation value for the transmitter unit TU from the result.

Figure 2:
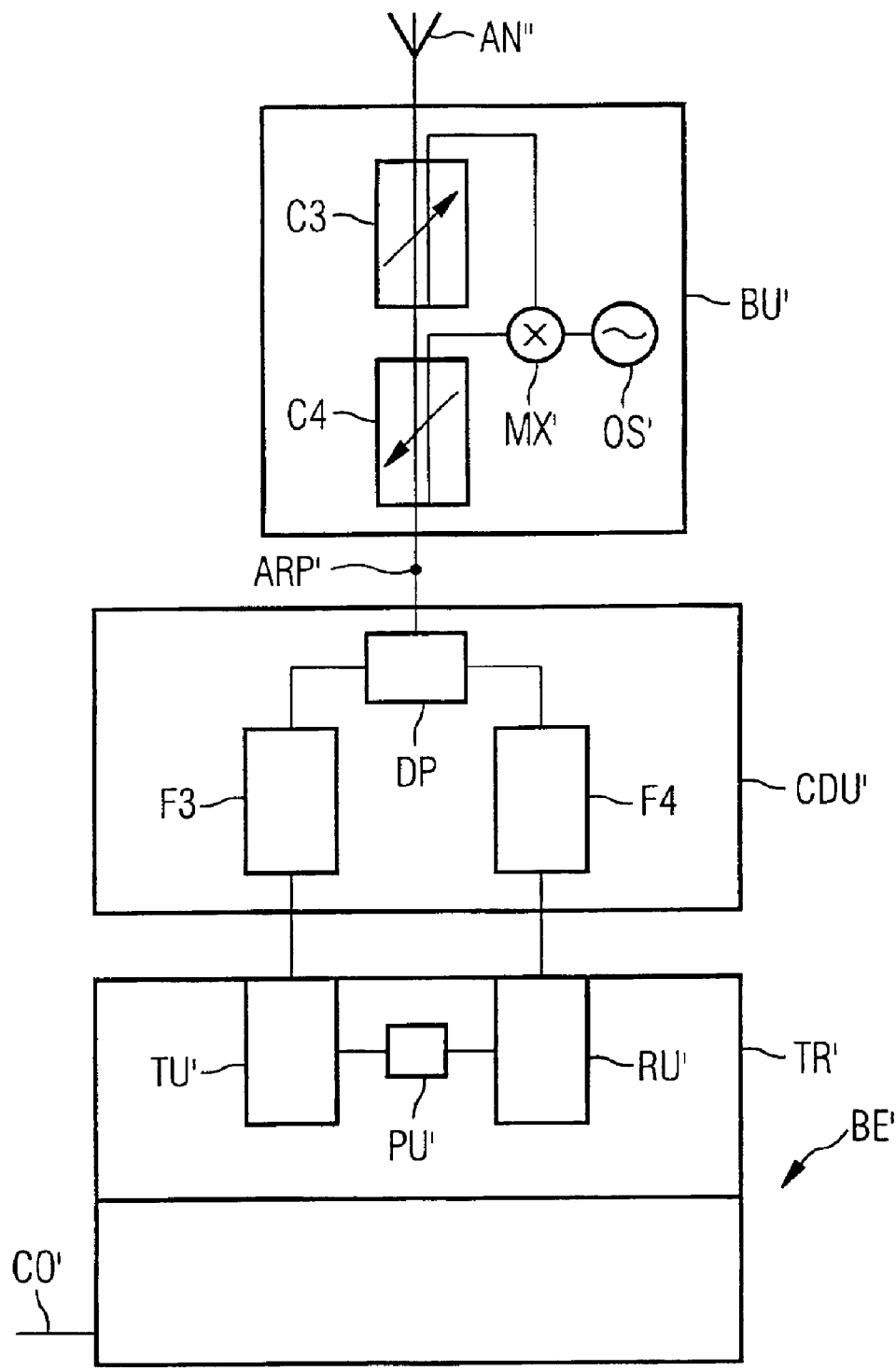
FIG. 2 shows a further base transceiver station according to the invention

FIG. 2 shows an alternative embodiment of a base transceiver station according to the invention. Corresponding reference signs in FIGS. 1 and 2 indicate corresponding components. In the base transceiver station of FIG. 2, the transmit path and the receive share a common section because a common antenna AN" is used for the signals sent by the transmitter unit TU' and received by the receiver unit RU'. The combining and distribution unit CDU' comprises a duplexer DP connecting the antenna AN" to the transmitter unit TU' and the receiver unit RU' via the filters F3, F4 in the combining and distribution unit CDU'.

In this embodiment, it is possible to branch the transferred signal off from the common section and feed it back into the common section. Both couplers C3 and C4 are therefore connected to the same section of the connection to the antenna. A mixer MX' and an oscillator OS' shift the frequency of the transferred signal as described with respect to FIG. 1.

The processing unit PU' in this embodiment is disposed separately from the transmitter unit TU' and receiver unit RU'. It is, however, also possible that is part of the transmitter unit or receiver unit.

Figure 3:
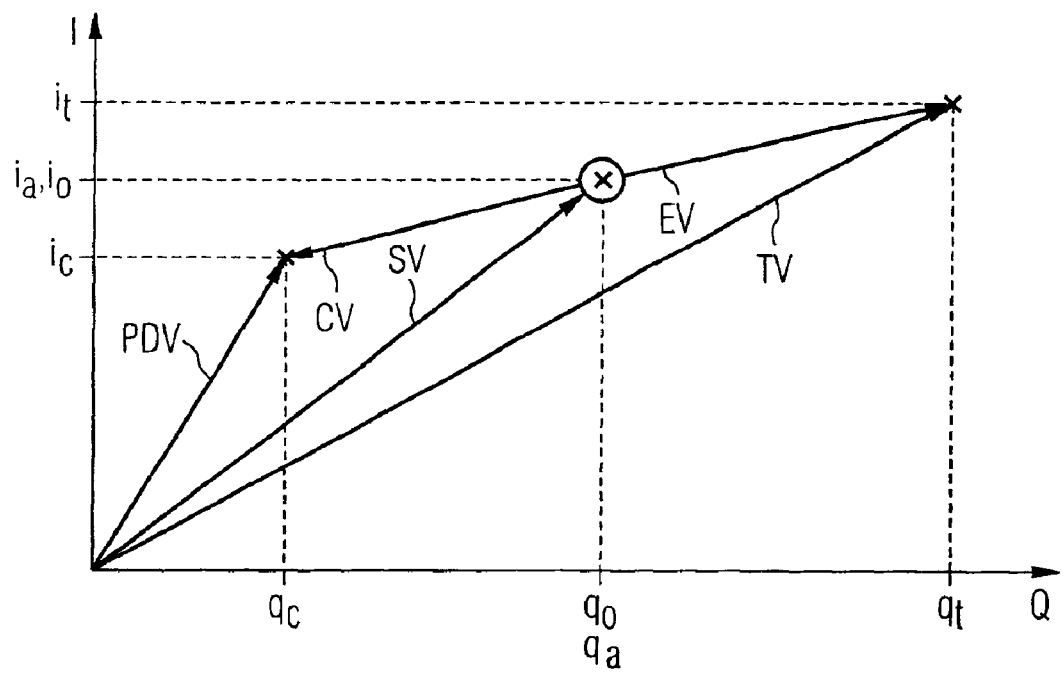
FIG. 3 shows a diagram illustrating the calculation of a compensation value.

The calculation of the compensation values is described with respect to FIG. 3. For the calculation, the transmitter sends an information representing the sent I- and Q-values to the processing unit. Consequently, the original vector SV with the components ($q_0$, $i_0$) corresponding to the I- and Q-values is available at the processing unit. The vector SV is the signal target which should be achieved at the antenna reference point ARP.

The transmitted vector TV with components ($q_t$, $i_t$) at the antenna reference point, i.e. the original vector SV distorted by the transmit path, is transferred by the branching unit to the receive path and received by the receiver. The transmitted vector TV is forwarded to the processing unit. The difference between transmitted vector TV and original vector SV is the error vector EV which is in this way calculated in the processing unit. The compensation vector CV is then determined from the error vector EV. In a first approximation, the compensation vector CV is the negative of the error vector EV. When the original vector SV was already determined by the transmitter unit using a former value of a compensation vector, the newly determined compensation vector CV is added to the former value.

By adding the compensation vector CV to the original vector SV, a compensated original vector PDV with components ($q_c$, $i_c$) is calculated for the I- and Q-data. If the compensated original vector PDV with components ($q_c$, $i_c$) is distorted by the transmit path, a resulting vector with components ($q_a$, $i_a$) is obtained at the antenna reference point ARP. Ideally, the components ($q_a$, $i_a$) of the resulting vector and the components ($q_0$, $i_0$) of original vector SV should be identical. If this is not achieved with sufficient precision, the value of the compensation vector CV can be refined in an iteration by repetition of the above steps until the remaining error vector EV is smaller than the required threshold. The compensation vector CV is stored. It is possible to determine more than one compensation vector, e.g. one compensation vector for every frequency channel configured for the transmitter. During the regular operation of the base transceiver station, the transmitted signals are corrected by the corresponding compensation vector.

If a transmitter unit in an already installed base transceiver station is updated, e.g. replaced, it is preferable to install a separate branching unit in the base transceiver station. Existing components of the transmit path like combining and distribution units or amplifiers can still be used after the update. In case of a new base transceiver station or a base transceiver station with a new combining and distribution unit, it is often advantageous if the combining and distribution unit comprises the branching unit. In this way, the number of hardware components in the base transceiver station is reduced.

The proposed base transceiver station is especially advantageous if the content of transmitted signals corresponds to a complex signal vector, for example if transmitted signals are EDGE signals or for Quadrature Phase Shift Keying (QPSK) signals as used in UMTS (Universal Mobile Telecommunication System). A high accuracy of the transmitted complex signal vector can be achieved with the proposed base transceiver station.

In order to achieve a good distortion compensation for the total frequency range of a transmitter unit, compensation values can be determined by the processing unit for different frequencies of transmitted signals. The transmitter unit predistorts the transmitted signals with the compensation value for the respective frequency. It is advantageous to determine compensation values only for those frequencies which are or can be configured for the transmitter unit. In this way, the number of measurements and the memory size for storing of the compensation values is minimized.

In a further embodiment, a method according to the invention is performed in a base transceiver station with a transmitter unit and a receiver unit. The method allows correction of signal distortions in the transmit path between the transmitter unit and an antenna. The transmitter unit determines first signals for transmission from input data and sends them into the transmit path. All or at least a portion of the first transmitted signals are branched off from the transmit path and are transferred to the receiver unit. It is advantageous to branch the signals off from the transmit path close to the antenna.

Output data from the signals transferred to the receiver unit are calculated and compared to the input data. Generally, representations of the input and output data are forwarded for this purpose to the unit performing the comparison. From the comparison a first compensation value is determined. Further transmitted signals are adjusted according to the determined first compensation value. The method is preferably executed after installation of a new component in the transmit path of a base transceiver station.

If the necessary distortion of the compensation is not attained in one step the method can be repeated. If a former compensation value is already present in the transmitter, the value can be adapted by the method. In a preferred embodiment of the method, the first signals are therefore determined using a preceding compensation value and the preceding compensation value is adjusted according to the first compensation value. For example, the first compensation value can be added to the preceding compensation value.

Advantageously, the frequency of the transferred signal is converted to the input range of the receiver unit. In this way, an existing receiver unit of the base transceiver station can be used in the method. For the same purpose, the transferred signal can be delayed until a reception interval of the receiver unit if the base transceiver station transmits and receives in different intervals of time.

The proposed method is especially advantageous if the content of a transmitted signal corresponds to a complex signal vector. In this case the input data and output data can be represented by data components relating to different phases and/or amplitudes. The data components determine the complex signal vector of the transmitted signals and the data components for the output data can be determined from the transferred signals. Examples of data components are I- and Q-values. Examples for signals corresponding to a complex signal vector are EDGE or UMTS signals.

To achieve a good compensation over the entire frequency range of a transmitter it is proposed to determine different compensation values for different frequencies of transmitted signals and correct the signals accordingly.

For example, a compensation value can be determined for every frequency channel for which the transmitter is configured.

In order to use an existing receiver in the base transceiver station, a free channel for reception of the transferred signals is necessary. Therefore, the method is preferably performed during a low traffic period, e.g. during the night, especially if the adjustment of the compensation value is performed in regular intervals. For the correction of constant distortions and long term changes like aging effects of the installed components it is generally sufficient to perform the method in long intervals like days or weeks. If tunable components like filters are part of the transmit path, the method is preferably performed after every reconfiguration.

A program unit according to the invention can be stored on a data carrier or be directly loadable into a processing unit of a base transceiver station, e.g. as a sequence of electrical or optical signals. The program unit can be executed in a processing system of a base transceiver station and is generally part of a software packet. Functions can be executed by using further software units, e.g. an operating system. The proposed program unit comprises code for the reception of input data corresponding to transmitted signals and of output data corresponding to received signals. The input data and the output data are compared and at least one compensation value is determined from the comparison. The determined compensation value is then transferred to a transmitter unit for correction of distortions by predistortion. The program unit can be executed in any of the

What is claimed is a:

1. Base transceiver station for a radio communication system, the base transceiver station having a transmitter unit, a receiver unit independent of said transmitter unit, and a transmit path between the transmitter unit and an antenna and a receive path between the receiver unit and said antenna, wherein the receiver unit determines output data from received signals and the transmitter unit converts input data into transmitted signals and pre-distorts the transmitted signals using at least one compensation value, and wherein the base transceiver station further comprises:

a branching unit for transferring at least a portion of a transmitted signal from the transmit path to the receiver unit; and a processing unit independent of said transmitter which is adapted to receive a representation of the input data to said transmitter unit and the output data from said receiver unit;

the processing unit being further adapted to compare the input data to the output data, to determine a first compensation value for the pre-distortion according to the comparison, and to update the compensation value of the transmitter unit with the first compensation value;

wherein said receive path is adapted to transfer the output of the branching unit to the receiver unit, and wherein the processing unit compares the input data to the output data and determines the first compensation value according to the comparison.

2. Base transceiver station according to claim 1, wherein the branching unit comprises a converter for converting the frequency of the transferred signal to the input range of the receiver unit.

3. Base transceiver station according to claim 2, wherein the converter comprises a mixer and an oscillator and the mixer mixes a signal generated by the oscillator and the transferred signals.

4. Base transceiver station according to claim 2, wherein the branching unit comprises an element for delaying the transferred signal.

5. Base transceiver station according to claim 2, wherein the branching unit comprises a connection between the transmit path and a receive path connecting an antenna and the receiver unit.

6. Base transceiver station according to claim 2, wherein the transmit path and a receive path connecting an antenna and the receiver unit have a common section and the branching unit feeds the transferred signal into the common section.

7. Base transceiver station according to claim 1, wherein the branching unit comprises an element for delaying the transferred signal.

8. Base transceiver station according to claim 1, wherein the branching unit comprises a connection between the transmit path and a receive path connecting an antenna and the receiver unit.

9. Base transceiver station according to claim 1, wherein the transmit path and a receive path connecting an antenna and the receiver unit have a common section and the branching unit feeds the transferred signal into the common section.

10. Base transceiver station according to claim 1, wherein the branching unit is connected to the transmit path near an antenna reference point.

11. Base transceiver station according to claim 1, wherein the branching unit is connected selectively to the transmit path and a receive path with a device selected from a group comprising a coupler and a switch.

12. Base transceiver station according to claim 1, wherein a combining and distribution unit comprises the branching unit.

13. Base transceiver station according to claim 1, wherein the content of a transmitted signal corresponds to a complex signal vector.

14. Base transceiver station according to claim 13, wherein the transmitted signals are EDGE signals or UMTS signals.

15. Base transceiver station according to claim 1, wherein the processing unit determines further compensation values for different frequencies of transmitted signals.

16. Method for the correction of signal distortions in a base transceiver station provided with a transmitter unit and a receiver unit independent of said transmitter unit, wherein transmitted signals are sent from the transmitter unit over a transmit path to an antenna, the method comprising the steps of:

determining first signals for transmission from input data and sending them into the transmit path;

branching off at least a portion of the first transmitted signals from the transmit path;

transferring the branched off signals to the receiver unit;

calculating output data from the signals transferred to the receiver unit;

comparing the input data and the output data in a processing unit independent of said transmitter unit;

determining at least one first compensation value according to the comparison; and adjusting further transmitted signals according to the first compensation value.

17. Method according to claim 16, wherein the first transmitted signals are determined using a preceding compensation value and the preceding compensation value is adjusted by the first compensation value.

18. Method according to claim 17, wherein the frequency of the transferred signal is converted to the input range of the receiver unit.

19. Method according to claim 17, wherein the signal is transferred to the receiver unit (RU) with a delay.

20. Method according to claim 17, wherein the content of a transmitted signal corresponds to a complex signal vector.

21. Method according to claim 16, wherein the frequency of the transferred signal is converted to the input range of the receiver unit.

22. Method according to claim 16, wherein the signal is transferred to the receiver unit with a delay.

23. Method according to claim 16, wherein the content of a transmitted signal corresponds to a complex signal vector.

24. Method according to claim 23, wherein the transmitted signals are EDGE signals or UMTS signals, selectively.

25. Method according to claim 16, wherein further compensation values are determined for different frequencies of transmitted signals.

26. Method according to claim 16, wherein the method is performed during a low traffic period.

* * * * *